E. C. FROST.
Range.
No. 196,347. Patented Oct. 23, 1877.
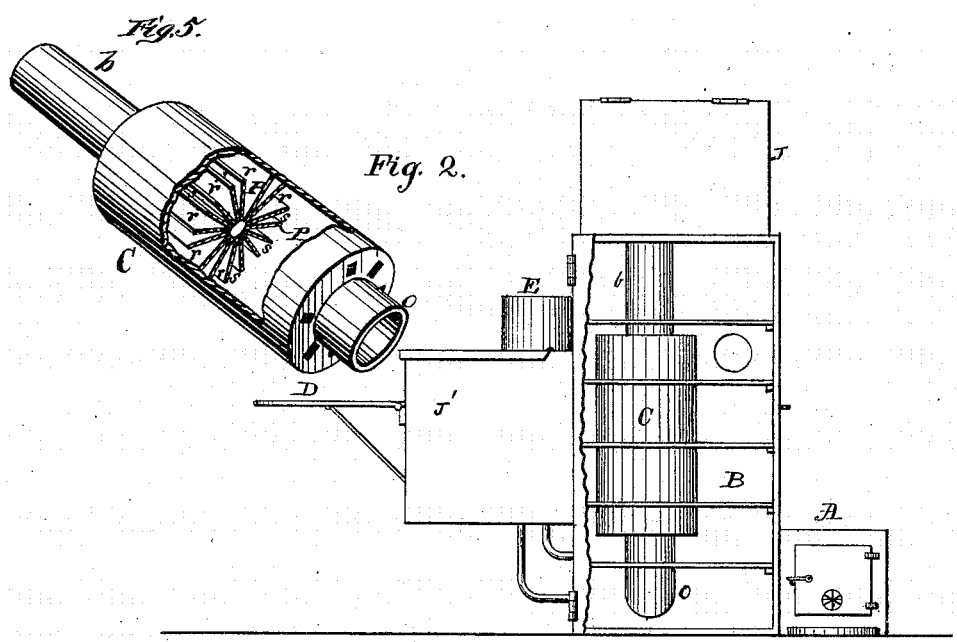
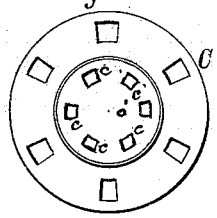
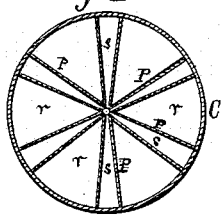
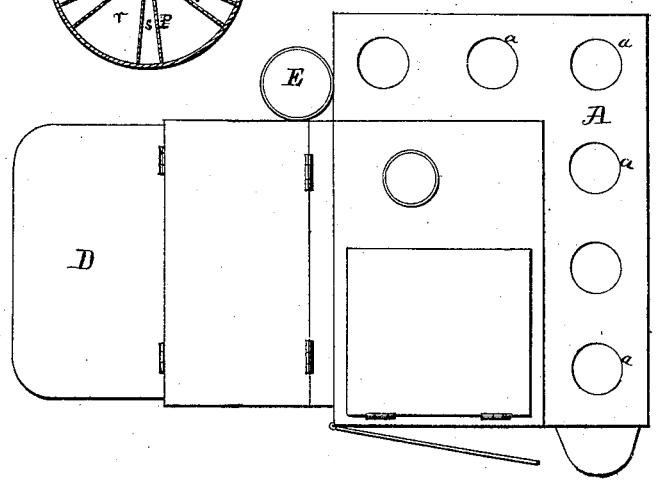

UNITED STATES PATENT OFFICE.

ELI C. FROST, OF WATKINS, NEW YORK.

IMPROVEMENT IN RANGES.

Specification forming part of Letters Patent No. 196,347, dated October 23, 1877; application filed April 8, 1876.

*To all whom it may concern:*

Be it known that I, E. C. FROST, of Watkins, in the county of Schuyler and State of New York, have invented a new and useful Improvement in Ranges, of which the following is a full, clear, and exact description, reference being had to the accompanying drawings, and letters of reference marked thereon, in which—

Figure 1 is a top view of my improved range. Fig. 2 is a front view of the same with the oven-door removed, showing the improved heater or drum located therein; and Fig. 3 is a top view of my improved heater, and Fig. 4 a central horizontal section thereof. Fig. 5 is a perspective view of the heater with a portion of the outer casing and the lower end of the radial plate removed.

My invention relates to improvements in ranges; and consists, first, in the employment of a heater or drum located, preferably, in the interior of the oven, through which the products of combustion pass and circulate over a series of air-tubes, opening at top and bottom into the oven, whereby a circulation of heated air in the oven is created, and the food therein cooked by the action of deflected as well as radiated heat.

My invention further consists in certain details of improvement, hereinafter more fully set forth.

In the accompanying drawings, A designates the furnace, provided on its upper face with a series of circular openings, a, for culinary vessels, and forming two sides of a rectangle, surrounding the lower end of two sides of the oven B, provided with shelves for the reception of vessels containing articles to be baked or cooked.

The products of combustion in the furnace pass in a right-angular course from its front to its rear, and thence pass through an opening in one of its inside faces, through a right-angular pipe, o, in the oven, and thence through the heater C in the oven, and out through the pipe b.

The heater C is provided with a series of plates, P, which converge toward the center of the heater, forming air-spaces s, opening at top and bottom into the oven.

c c are openings in the top of the heater C for the passage of the products of combustion into the pipe b.

By this construction, the air passing up through the space s is thoroughly heated, the progress of the products of combustion through the heater being retarded by the plate o', provided with perforations c, and a circulation of air is created, the cold air in the oven as it is heated passing up through the spaces s, and thence over the top, bottom, and sides of the articles on the shelves, and, as it becomes partially cooled, descending and again entering the spaces s at the bottom of the heater, to be again warmed, thus keeping up a constant circulation of heated air over the top, sides, and bottom of the oven-shelves.

The heat thus utilized is deflected heat, while the radiated heat from the furnace also assists in heating the oven. After the air is heated and circulated until it becomes nearly of the same temperature, the circulation will become less rapid.

If desired, a damper may be placed on the oven-door, or on its side, through which cold air may be admitted when desired.

The upper face of the furnace A, between the openings a, can be employed for cooking purposes, or keeping warm cooked articles.

E is a hot-water receptacle, provided at its lower end with pipes leading from it to the furnace-fire.

D is a swinging carving-table; and J and J' are chambers for keeping dishes warm, or for raising bread, or for other analogous purposes.

Having thus fully described my invention, what I claim as new, and desire to secure by Letters Patent, is—

1. The heater C, provided with the radial converging plates P, forming air-spaces s, open at top and bottom, surrounded by flame-passages r, and perforated top plate o, substantially as described, and for the purpose set forth.

2. In combination with an oven, the heater

C, constructed as set forth, and located in the interior of said oven, substantially as described, and for the purpose set forth.

3. In combination with the oven B and heater C, situated in the interior of said oven, the range A, surrounding the lower ends of two sides of the oven, and provided with a flue, leading into said heater, substantially as described, and for the purpose set forth.

4. The oven B, provided with the chambers J J', heating-tank E, and heater C, substantially as described, and for the purpose set forth.

ELI C. FROST.

Witnesses:
  CORRY ROOD,
  LEWIS ROBERTS.